(12) United States Patent
Kang

(10) Patent No.: US 7,468,201 B2
(45) Date of Patent: Dec. 23, 2008

(54) MATERIALS FOR HIGH DENSITY OPTICAL RECORDING MEDIA

(75) Inventor: Jen-Ho Kang, Hsinchu (TW)

(73) Assignee: Gigastorage Corporation, Hsinchu (TW)

( * ) Notice: Subject to any disclaimer, the term of this patent is extended or adjusted under 35 U.S.C. 154(b) by 1043 days.

(21) Appl. No.: 10/812,931

(22) Filed: Mar. 31, 2004

(65) Prior Publication Data

US 2004/0225115 A1 Nov. 11, 2004

(30) Foreign Application Priority Data

May 9, 2003 (TW) ............................... 92112627 A

(51) Int. Cl.
*B32B 3/00* (2006.01)
(52) U.S. Cl. .................... 428/64.4; 564/84; 534/554
(58) Field of Classification Search ............... 428/64.1, 428/64.4; 564/84; 534/554
See application file for complete search history.

(56) References Cited

U.S. PATENT DOCUMENTS

| | | | | |
|---|---|---|---|---|
| 6,168,843 B1 * | 1/2001 | Kambe et al. | ............... | 428/64.1 |
| 6,242,067 B1 * | 6/2001 | Kambe et al. | ............... | 428/64.1 |
| 6,284,877 B1 * | 9/2001 | Okamoto et al. | ............ | 534/707 |

* cited by examiner

*Primary Examiner*—Steven Bos
*Assistant Examiner*—Paul Wartalowicz
(74) *Attorney, Agent, or Firm*—Bacon & Thomas, PLLC

(57) ABSTRACT

Materials for optical recording media are disclosed. Specifically, the materials are metal chelate compounds of azo dyes, which are formed from sulfamoylated m-diaminobenzene compounds and benzene ring-containing azo compounds. Further, the invention provides an optical recording medium, characterized in that said metal chelate compounds of azo dyes are employed onto the optical recording medium to form a recording layer. The invention also discloses a process for the production of an optical recording medium.

16 Claims, No Drawings

MATERIALS FOR HIGH DENSITY OPTICAL RECORDING MEDIA

FIELD OF THE INVENTION

The present invention relates to materials for high density optical recording media, to optical recording media comprising said materials as a recording layer, and to a process for the preparation thereof.

BACKGROUND OF THE INVENTION

Recordable optical recording media have been developed since 1980s. Said media mainly comprise a substrate, a recording layer, a reflective layer and a protective layer. At present, the organic materials suitable for the recording layer of recordable optical recording media, such as compact disks (often referred to as CD-R) comprise cyanine dyes, phthalocyanine dyes and azo dyes and the likes. These dyes commonly have a maximal absorption at a wavelength of 650 nm to 750 nm in the visible light range. As a major function, the dyes absorb a laser beam of 780 nm and then convert it into thermal energy, such that the recording layer changes in its optical characteristics to fulfill the reflectance requirements as set forth in the specification of the compact disks (Red Book). In view thereof, organic materials having a major light absorption at a wavelength outside the wavelength range of the laser beam are needed for the recording layer of the optical recording media.

Therefore, since 1990s, in order to satisfy the trend of continuous data expansion, all the major CD manufacturers make efforts at the improvements of the recording density of the CDs. To that end, the spaces between the pits and between the tracks are decreased and, in the meantime, the laser beams for reading signal are narrowed to avoid the signal cross-talk between the tracks and to raise the discriminated ratio of track length. As a result, almost all the current developments are concentrated on the laser beams with wavelengths of 635 nm to 660 nm.

According to the current developmental trend of the optical recording media, organic materials for the recordable optical recording media used at laser beams with 650 nm preferably has a light absorption at a wavelength of from 540 nm to 600 nm.

In general, one of the common materials for recording layers in the application of optical recording media is a cyanine dye. However, owing to the poor light resistance and the storage difficulty of said cyanine dye, metal chelate compounds of azo dyes having superior light- and weather resistance are suitable for recording layer. For example, U.S. Pat. No. 5,532,342 discloses an azo metal chelate compound formed from a sulfonylphenyl-based azo compound and a variety of metal ligands, which may be applied to optical recording media, whereby a recording layer having an absorption wavelength of from 700 nm to 730 nm may be prepared.

SUMMARY OF THE INVENTION

Therefore, the objective of the present invention is to provide metal chelate compounds of azo dyes having absorption at a shorter wavelength, which may be served as materials of a recording layer in optical recording media, particularly the recording layer of high density optical recording media.

DETAILED DESCRIPTION OF THE INVENTION

The objective of the present invention is to provide materials for high density recording media. Specifically, the present invention is to provide metal chelate compounds of azo dyes, which are served as materials of a recording layer in optical recording media. Particularly, said compounds are served as a recording layer of optical recording media having an optical storage system at a wavelength range of from 635 nm to 660 nm.

The further objective of the present invention is to provide high density optical recording media comprising a recording layer and a reflective layer successively positioned onto a substrate in order, which is characterized in that the recording layer is formed from metal chelate compounds of azo dyes according to the present invention.

The further objective of the present invention is to provide a process for the preparation of said high density optical recording media.

According to the present invention, the organic materials for the recording layer in optical recording media are metal chelate compounds of azo dyes represented by the following formula (I),

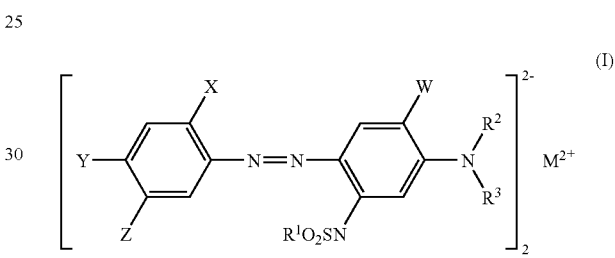

in which $R^1$ represents alkyl or aryl, preferably $C_{1-6}$alkyl or phenyl, optionally substituted, preferably substituted with $C_{1-6}$alkyl. More preferably, $R^1$ is selected from methyl, phenyl or methylphenyl.

$R^2$ and $R^3$, which may be identical or different, represent, independently of each other, unsubstituted or substituted alkyl, preferably unsubstituted or substituted $C_{1-6}$alkyl. More preferably, $R^2$ and $R^3$ represent, independently of each other, methyl or ethyl.

W represents hydrogen, alkyl, alkoxy or halogen, preferably hydrogen, $C_{1-6}$alkyl, $C_{1-6}$alkoxy or halogen, optionally substituted. More preferably, W represents hydrogen, methyl, methoxy or chloro.

X represents hydrogen, alkyl, alkoxy or halogen, preferably hydrogen, $C_{1-6}$alkyl, $C_{1-6}$alkoxy or halogen, optionally substituted. More preferably, X represents hydrogen, methyl or methoxy.

Y represents hydrogen or an amino derivative, preferably hydrogen or benzamido (hereinafter referred to as "NBz").

Z represents hydrogen, alkyl, alkoxy or halogen, preferably hydrogen, $C_{1-6}$alkyl, $C_{1-6}$alkoxy or halogen, optionally substituted. More preferably, Z represents hydrogen, methyl or methoxy.

M represents a divalent metal selected from the elements of Group IB, IIB, or VIIIB in Periodic Table, preferably Ni, Cu or Zn.

According to the present invention, the compounds of formula (I) contain a meta diaminophenyl compound as a basic structural unit. Preferably, the basic structural unit contains meta diaminophenyl compounds with sulfamoylation on monoamino group, and a benzene ring-containing azo compound.

According to the present invention, the compounds of formula (I) for a recording layer may be prepared by synthetic methods.

According to the present invention, the high density optical recording media comprise a reflective layer and a recording layer, characterized in that the recording layer in optical recording media is formed from the compounds of formula (I).

According to the present invention, the optical recording media are prepared by a process comprising the steps as below:

A round disc-shaped polymer substrate (such as polycarbonate substrate) having an outer diameter of from 110 to 130 mm (preferably 120 mm), an inner diameter of from 10 to 20 mm (preferably 15 mm) and a thickness of from 0.3 to 1 mm (preferably 0.6 mm), is produced by an injection molding machine. In the meantime, the substrate is printed with continuous spiral grooves having a depth of from 150 to 180 nm, a half-height width of from 340 to 380 nm and a bottom width of from 260 to 280 nm via a stamper.

Next, azo metal chelate compounds are dissolved in a solvent to form a 1.0 to 2.0% (particularly 1.5%) solution of metal chelate compounds of azo dyes. Thereafter, the dye solution is spun coated onto a substrate. To avoid over-corrosion of the plastic substrate caused by the solvents of the dye solution applied on the recording layer, the solvents used are preferably fluoroalcohols, particularly terafluoropropanol.

After coating the dye solution onto the recording layer, the absorption of the layer determined by UV-visible spectroscopy at the maximal absorption wavelength is in a range of from 0.7 to 0.8. The coated substrate is then baked at a temperature of 60 to 80□ for 10 to 20 minutes to evaporate off solvents completely.

Subsequently, the recording layer coated with dyes is then sputtered with a layer of 100 to 160 nm thickness of metal reflective layer, preferably 120-150 nm, more preferably 120 nm gold reflective layer. The reflective layer is then spun coated with a layer of lacquer protective gel, such as acrylics gel, followed by hardening said lacquer to form a protective layer, to which a sheet of polymer substrate, particularly a transparent substrate (preferably polycarbonate substrate) having a thickness of 0.3 to 1 mm (preferably 0.6 mm) and a diameter of 110 to 130 mm (preferably 120 mm) is attached by screen printing or spin coating, to obtain a recordable optical recording medium with a thickness of 1.00 to 1.50 mm (preferably 1.20 to 1.25 mm) and a diameter of 110 to 130 mm (preferably 120 mm).

Signals are recorded on optical recording media prepared by the aforesaid process using a commercially available recording machine (such as DVR-2000, from Pioneer Corporation), and then the properties of the recording media are determined by a commercially available tester (such as DVD-Q2000, from Aeco Ltd.).

EXAMPLES

The present invention will be described in further detail with reference to Examples. However, the present invention is by no means restricted by the following examples. Any modifications that do not depart from the spirit of the present invention should be understood to fall within the scope of the present invention.

Preparation of Metal Chelate Compounds of Azo Dyes

Preparation Example

Azo Metal Chelate Compound 12

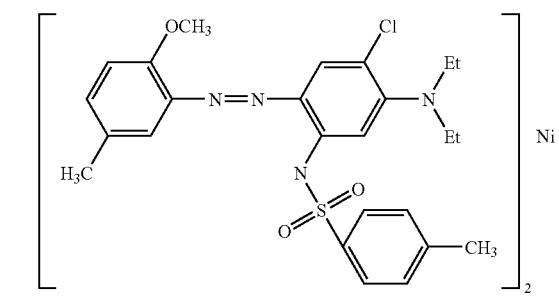

In this example, the metal chelate compound of azo dye 12 was prepared by the following steps:
1) 40 g (0.21 mole, 1.05 eq.) of tosyl chloride was charged into a dry closed system, and then cooled to 0-5□ in an ice water bath.
2) 39.6 g (0.2 mol) of 4-chloro-N,N-diethyl-1,3-diaminobenzene was dissolved in 90 ml of toluene, followed by adding the resulting solution slowly into the solution prepared in step 1. The system was controlled to a temperature of less than 5□ with stirring for one hour, followed by standing overnight and adding 200 ml of ice water. Thereafter, the resulting product was filtrated and dried to obtain 60.8 g of Compound A.

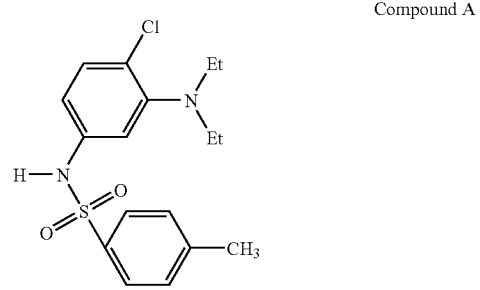

Compound A 3) 52.8 g (0.15 mol) of Compound A, 9 g of urea and 60 g of sodium acetate were dissolved in 600 ml of methanol, and then was transferred to ice water bath and stirred.
4) 66 ml of 37% hydrochloric acid and 450 ml of ice water were added into 22.6 g (0.165 mol.) of 2-methoxy-5-methylaniline in ice water bath with stirring for 1 hour. 11.73 g (0.17 mol) of sodium nitrite was dissolved in 100 ml of water, followed by adding said solution slowly into the reaction mixture and stirring in ice bath for 30 minutes. Thereafter, the resulting solution was slowly added into the system of step 3. After maintaining the reaction in ice bath for 3 hours, the product stood overnight and then was filtered, washed with water and dried, to obtain 46.4 g of Compound B.

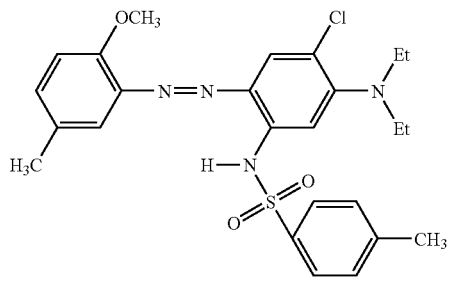

Compound B 5) 25.0 g (50 mmol) of Compound B and 4.92 g (60 mmol) of sodium acetate were dissolved in 400 ml of tetrahydrofuran (THF) and 400 ml of water, followed by stirring for 10 minutes. After dissolving 6.84 g (27.5 mmol) of a tetrahydrat complex of nickel acetate $Ni(CH_3COO)_2 \cdot xH_2O$ (x=4) in 50 ml of methanol, the reaction was carried out for 2 hours. After the completion of the reaction, 400 ml of water was added in the mixture with stirring for 1 hour and then the mixture stood overnight. Thereafter, the resulting product was filtered and the solid filtrate was washed with water and dried to obtain 13.5 g of Compound 12 as shown in Table 1 below.

Compounds 1 to 11 shown in Table 1 are prepared by similar procedures as stated in the aforesaid preparation example.

a half-height width of 350 nm, a bottom width of 250 nm and a pitch of 740 nm was produced by a injection molding machine.

At a temperature of 25☐ and a relative humidity of 40-50%, 1 ml of a 1.5% solution of azo metal chelate compound 1 in 2,2,3,3-tetrafluoropropanol was added dropwise to the polycarbonate substrate at its inner periphery. In the meantime, the substrate was spun at a rate of 600 rpm for 3 seconds, and then at 1000, 2000 and 5000 rpm each for 3 seconds, to obtain a recording layer uniformly covered by a dye. The thus coated substrate was then baked at 60☐ for 20 minutes and a uniform and dried optical recording layer was formed.

Thereafter, 120 nm thick gold film was formed on the recording layer as a reflective layer by a sputtering machine. The reflective layer was then spun coated with about 4000 to 5000 nm of UV-curable acrylic resin (U.V. lacquer). The resultant layer was cured with UV as a protective layer. The protective layer was then spun coated with a layer of adhesive, on which a transparent polycarbonate substrate having no grooves, a thickness of 0.6 mm and an outer diameter of 120 mm was attached, to obtain a recordable optical recording medium with a thickness of 1.2 mm and an outer diameter of 120 mm.

The modulation signals which meet the data format of 4.7 gigabytes DVD were written on the optical recording media prepared above by using a commercially available recording

TABLE 1

Dye compounds 1 to 12

| Compound | $R^1$ | $R^2$ | $R^3$ | W | X | Y | Z | M |
|---|---|---|---|---|---|---|---|---|
| 1 | $CH_3$ | $CH_3$ | $CH_3$ | $CH_3$ | H | NBz | H | Ni |
| 2 | $CH_3$ | $CH_3$ | $CH_3$ | $OCH_3$ | $CH_3$ | NBz | $OCH_3$ | Ni |
| 3 | $CH_3$ | $C_2H_5$ | $C_2H_5$ | H | $OCH_3$ | NBz | $OCH_3$ | Cu |
| 4 | $CH_3$ | $C_2H_5$ | $C_2H_5$ | Cl | $OCH_3$ | H | $CH_3$ | Zn |
| 5 | $C_6H_5$ | $CH_3$ | $CH_3$ | $CH_3$ | H | NBz | H | Ni |
| 6 | $C_6H_5$ | $CH_3$ | $CH_3$ | $OCH_3$ | $CH_3$ | NBz | $OCH_3$ | Ni |
| 7 | $C_6H_5$ | $C_2H_5$ | $C_2H_5$ | H | $OCH_3$ | NBz | $OCH_3$ | Ni |
| 8 | $C_6H_5$ | $C_2H_5$ | $C_2H_5$ | Cl | $OCH_3$ | H | $CH_3$ | Ni |
| 9 | $C_6H_4CH_3$ | $CH_3$ | $CH_3$ | $CH_3$ | H | NBz | H | Ni |
| 10 | $C_6H_4CH_3$ | $CH_3$ | $CH_3$ | $OCH_3$ | $CH_3$ | NBz | $OCH_3$ | Ni |
| 11 | $C_6H_4CH_3$ | $C_2H_5$ | $C_2H_5$ | H | $OCH_3$ | NBz | $OCH_3$ | Ni |
| 12 | $C_6H_4CH_3$ | $C_2H_5$ | $C_2H_5$ | Cl | $OCH_3$ | H | $CH_3$ | Ni |

Note:
NBz is benzamide represented by the following formula

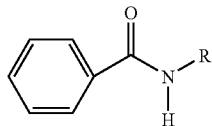

Manufacture of the Recordable Optical Recording Media

Example 1

A round polycarbonate substrate having an outer diameter of 120 mm, an inner diameter of 15 mm, a thickness of 0.6 mm and continuous spiral grooves having a depth of 170 nm, machine DVR-2000 (from Pioneer Corporation), then the properties of the optical recording media were determined via a commercially available tester DVD-Q2000 (from Aeco Ltd.). The results are shown in Table 2.

Example 2

Except that Compound 2 is used in place of the dye used in Example 1, all the procedures and tests of Example 1 are repeated. The results are shown in Table 2.

Example 3

Except that Compound 3 is used in place of the dye used in Example 1, all the procedures and tests of Example 1 are repeated. The results are shown in Table 2.

Example 4

Except that Compound 4 is used in place of the dye used in Example 1, all the procedures and tests of Example 1 are repeated. The results are shown in Table 2.

Example 5

Except that Compound 5 is used in place of the dye used in Example 1, all the procedures and tests of Example 1 are repeated. The results are shown in Table 2.

Example 6

Except that Compound 6 is used in place of the dye used in Example 1, all the procedures and tests of Example 1 are repeated. The results are shown in Table 2.

Example 7

Except that Compound 7 is used in place of the dye used in Example 1, all the procedures and tests of Example 1 are repeated. The results are shown in Table 2.

Example 8

Except that Compound 8 is used in place of the dye used in Example 1, all the procedures and tests of Example 1 are repeated. The results are shown in Table 2.

Example 9

Except that Compound 9 is used in place of the dye used in Example 1, all the procedures and tests of Example 1 are repeated. The results are shown in Table 2.

Example 10

Except that Compound 10 is used in place of the dye used in Example 1, all the procedures and tests of Example 1 are repeated. The results are shown in Table 2.

Example 11

Except that Compound 11 is used in place of the dye used in Example 1, all the procedures and tests of Example 1 are repeated. The results are shown in Table 2.

Example 12

Except that Compound 12 is used in place of the dye used in Example 1, all the procedures and tests of Example 1 are repeated. The results are shown in Table 2.

TABLE 2

The dynamic test results of recording layers containing Compounds 1 to 12

| Example | Jitter (%) Ave. | Ref (%) Ave. | $I_{14}/I_{14H}$ Ave. | $I_3/I_{14H}$ Ave. | PPr Ave. |
|---|---|---|---|---|---|
| 1 | 7.5 | 56 | 0.60 | 0.18 | 0.57 |
| 2 | 7.6 | 55 | 0.60 | 0.19 | 0.55 |
| 3 | 8.2 | 57 | 0.55 | 0.22 | 0.70 |
| 4 | 8.5 | 55 | 0.58 | 0.20 | 0.65 |
| 5 | 8.0 | 58 | 0.61 | 0.18 | 0.65 |
| 6 | 7.9 | 58 | 0.60 | 0.17 | 0.65 |
| 7 | 8.0 | 59 | 0.61 | 0.16 | 0.64 |
| 8 | 8.0 | 58 | 0.62 | 0.16 | 0.65 |
| 9 | 7.8 | 57 | 0.60 | 0.17 | 0.58 |
| 10 | 7.9 | 57 | 0.61 | 0.18 | 0.59 |
| 11 | 8.0 | 59 | 0.60 | 0.18 | 0.58 |
| 12 | 7.6 | 58 | 0.62 | 0.17 | 0.58 |
| Standards of the Specification | 8% | 45-85% | >0.6 | >0.15 | 0.5-1.0 |

Note:
Jitter: jitter value;
Ref: reflectance;
$I_3$: 3T intensity;
$I_{14}$: 14T intensity;
PPr: push-pull ratio.

Based on the test results listed in Table 2, it can be concluded that the novel metal chelate compounds of azo dyes according to the present invention can satisfy the standards of the specification, and indeed can achieve the effects for the high density optical recording media.

I claim:

1. Materials for high density optical recording media, represented by azo metal chelate compounds of formula (I):

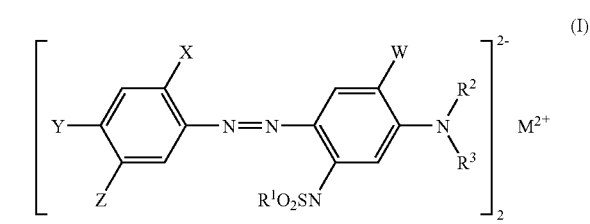

in which $R^1$ represents $C_{1-6}$alkyl, phenyl or $C_{1-6}$alkyl-substituted phenyl;

$R^2$ and $R^3$, independently of each other, represent identical or different $C_{1-6}$alkyl, optionally substituted by $C_{1-6}$alkyl;

W represents hydrogen, $C_{1-6}$alkyl, $C_{1-6}$alkoxy or halogen;

X represents hydrogen, $C_{1-6}$alkyl, $C_{1-6}$alkoxy or halogen;

Y represents hydrogen or an amino derivative;

Z represents hydrogen, $C_{1-6}$alkyl, $C_{1-6}$alkoxy or halogen;

M represents a divalent metal selected from Group IB, IIB or VIIIB in Periodic Table.

2. Materials according to claim 1, wherein $R^1$ is selected from methyl, phenyl or methylphenyl; $R^2$ and $R^3$, independently of each other, represent identical or different methyl or ethyl.

3. Materials according to claim 1, wherein W represents hydrogen, methyl, methoxy or chloro; X represents hydrogen, methyl or methoxy; Y represents hydrogen or benzamido (NBz); Z represents hydrogen, methyl or methoxy.

4. Materials according to claim 1, wherein the divalent metal M represents Ni, Cu or Zn.

5. High density recordable optical recording media, comprising a recording layer and a reflective layer formed on a substrate in order, characterized in that the recording layer is coated with an azo metal chelate compound of formula (I):

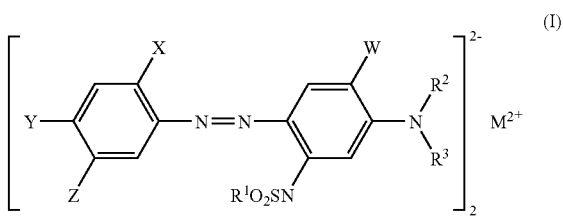

in which

R¹ represents $C_{1-6}$alkyl phenyl or $C_{1-6}$alkyl-substituted phenyl;

R² and R³, independently of each other, represent the same or different $C_{1-6}$alkyl, optionally substituted by $C_{1-6}$alkyl;

W represents hydrogen, $C_{1-6}$alkyl, $C_{1-6}$alkoxy or halogen;

X represents hydrogen, $C_{1-6}$alkyl, $C_{1-6}$alkoxy or halogen;

Y represents hydrogen or an amino derivative;

Z represents hydrogen, $C_{1-6}$alkyl, $C_{1-6}$alkoxy or halogen;

M represents a divalent metal selected from Group IB, IIB or VIIIB in Periodic Table.

6. High density optical recording media according to claim 5, wherein R¹ is selected from the group consisting of methyl, phenyl or methylphenyl; R² and R³, independently of each other, represent identical or different methyl or ethyl.

7. High density optical recording media according to claim 5, wherein W represents hydrogen, methyl, methoxy or chloro; X represents hydrogen, methyl or methoxy; Y represents hydrogen or benzamido (NBz); Z represents hydrogen, methyl or methoxy.

8. High density optical recording media according to claim 5, wherein the divalent metal M represents Ni, Cu or Zn.

9. A process for the preparation of high density optical recording media according to claim 5, comprising the steps of:

1) preparing a round polymer substrate having an outer diameter of 120 mm, an inner diameter of 15 mm, a thickness of 0.6 mm by infection molding and forming continuous spiral grooves having a depth of 150 to 180 nm, a half-height width of 340 to 380 nm, a bottom width of 260 to 280 nm thereon by printing with a stamper, 2) dissolving the materials according to claim 1 in solvents to form a 1.5% solution of azo metal chelate compounds, followed by spin coating the substrate with the dye solution to form a coating, 3) obtaining an absorption at the maximal absorption wavelength in a range of 0.7 to 0.8 after coating the recording layer with the dye solution, determined by UV-Visible Spectroscopy, 4) baking the coating at a temperature of 60 to 80° C. for 10 to 20 minutes to evaporate off solvents, 5) forming a gold film having a thickness of about 120 nm as a reflective layer on the recording layer containing a dye by a sputtering machine, then spin coating said substrate with a lacquer and curing it to form a protective layer, and 6) coating the protective layer with a layer of adhesive by screen printing or spin coating, on which a transparent polymer substrate having a thickness of 0.6 mm and an outer diameter of 120 mm is attached, to obtain a recordable optical recording medium with a thickness of 1.2 to 1.25 mm and an outer diameter of 120 mm.

10. A process for the preparation of high density optical recording media according to claim 6, comprising the steps of:

1) preparing a round polymer substrate having an outer diameter of 120 mm, an inner diameter of 15 mm, a thickness of 0.6 mm by infection molding and forming continuous spiral grooves having a depth of 150 to 180 nm, a half-height width of 340 to 380 nm, a bottom width of 260 to 280 nm thereon by printing with a stamper, 2) dissolving the materials according to claim 2 in solvents to form a 1.5% solution of azo metal chelate compounds, followed by spin coating the substrate with the dye solution to form a coating, 3) obtaining an absorption at the maximal absorption wavelength in a range of 0.7 to 0.8 after coating the recording layer with the dye solution, determined by UV-Visible Spectroscopy, 4) baking the coating at a temperature of 60 to 80° C. for 10 to 20 minutes to evaporate off solvents, 5) forming a gold film having a thickness of about 120 nm as a reflective layer on the recording layer containing a dye by a sputtering machine, then spin coating said substrate with a lacquer and curing it to form a protective layer, and 6) coating the protective layer with a layer of adhesive by screen printing or spin coating, on which a transparent polymer substrate having a thickness of 0.6 mm and an outer diameter of 120 mm is attached, to obtain a recordable optical recording medium with a thickness of 1.2 to 1.25 mm and an outer diameter of 120 mm.

11. A process for the preparation of high density optical recording media according to claim 7, comprising the steps of:

1) preparing a round polymer substrate having an outer diameter of 120 mm, an inner diameter of 15 mm, a thickness of 0.6 mm by infection molding and forming continuous spiral grooves having a depth of 150 to 180 nm, a half-height width of 340 to 380 nm, a bottom width of 260 to 280 nm thereon by printing with a stamper, 2) dissolving the materials according to claim 3 in solvents to form a 1.5% solution of azo metal chelate compounds, followed by spin coating the substrate with the dye solution to form a coating, 3) obtaining an absorption at the maximal absorption wavelength in a range of 0.7 to 0.8 after coating the recording layer with the dye solution, determined by UV-Visible Spectroscopy, 4) baking the coating at a temperature of 60 to 80° C. for 10 to 20 minutes to evaporate off solvents, 5) forming a gold film having a thickness of about 120 nm as a reflective layer on the recording layer containing a dye by a sputtering machine, then spin coating said substrate with a lacquer and curing it to form a protective layer, and 6) coating the protective layer with a layer of adhesive by screen printing or spin coating, on which a transparent polymer substrate having a thickness of 0.6 mm and an outer diameter of 120 mm is attached, to obtain a recordable optical recording medium with a thickness of 1.2 to 1.25 mm and an outer diameter of 120 mm.

12. A process for the preparation of high density optical recording media according to claim 8, comprising the steps of:

1) preparing a round polymer substrate having an outer diameter of 120 mm, an inner diameter of 15 mm, a thickness of 0.6 mm by infection molding and forming continuous spiral grooves having a depth of 150 to 180 nm, a half-height width of 340 to 380 nm, a bottom width of 260 to 280 nm thereon by printing with a stamper, 2) dissolving the materials according to claim 4 in solvents to form a 1.5% solution of azo metal chelate compounds, followed by spin coating the substrate with the dye solution to form a coating, 3) obtaining an absorption at the maximal absorption wavelength in a range of 0.7 to 0.8 after coating the recording layer with the dye solution, determined by UV-Visible Spectroscopy, 4) baking the coating at a temperature of 60 to 80° C. for 10 to 20 minutes to evaporate off solvents, 5) forming a gold film having a thickness of about 120 nm as a reflective layer on the recording layer containing a dye by a sputtering machine, then spin coating said substrate with a lacquer and curing it to form a protective layer, and 6) coating the protective layer with a layer of adhesive by screen printing or spin coating, on which a transparent polymer substrate having a thickness of 0.6 mm and an outer diameter of 120 mm is attached, to obtain a recordable optical recording medium with a thickness of 1.2 to 1.25 mm and an outer diameter of 120 mm.

13. The process according to claim 9, wherein the substrate is polycarbonate.

14. The process according to claim 10, wherein the substrate is polycarbonate.

15. The process according to claim 11, wherein the substrate is polycarbonate.

16. The process according to claim 12, wherein the substrate is polycarbonate.

* * * * *